April 25, 1967    J. M. G. D. DEL CASTILLO    3,315,648
INTERNAL COMBUSTION ENGINE Filed Oct. 8, 1964    7 Sheets-Sheet 2

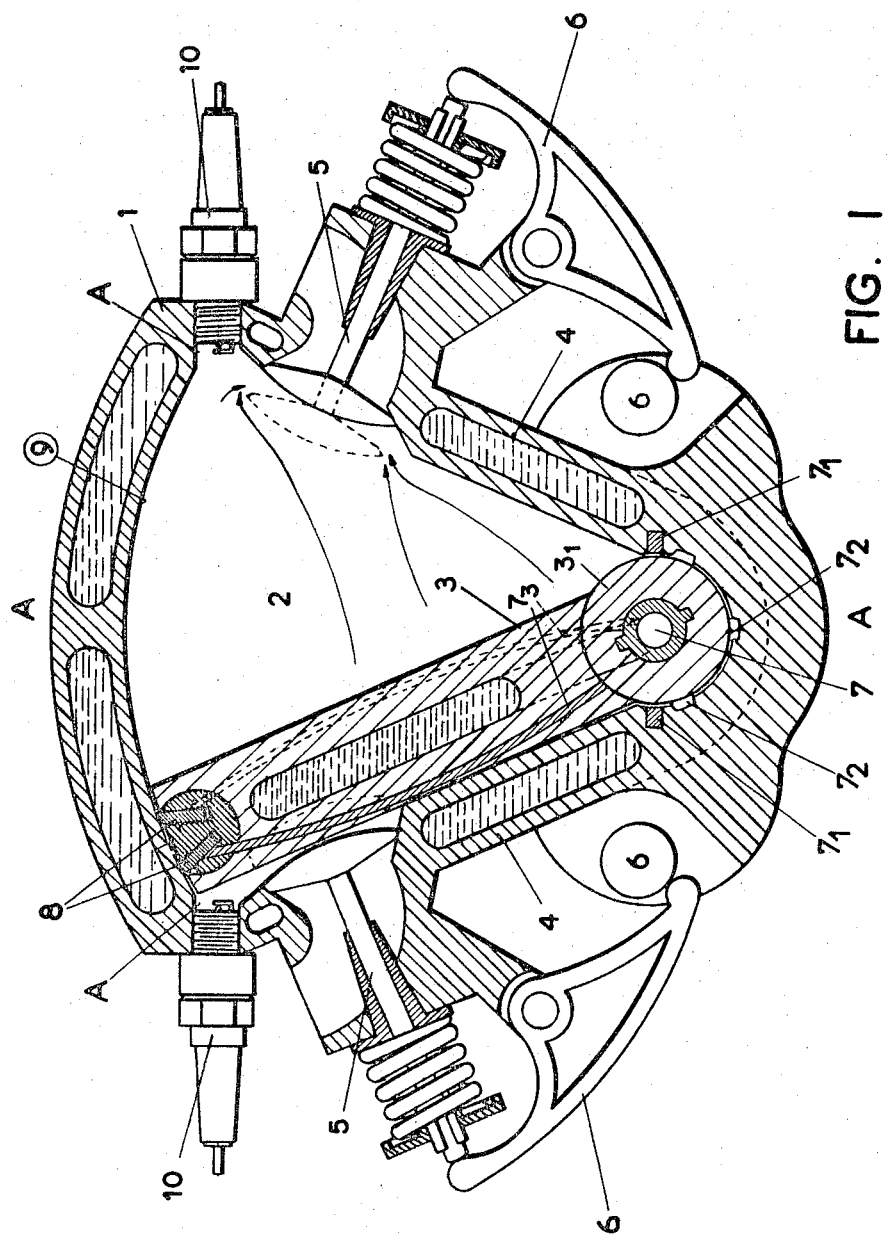

Jacques M. G. Drake Del Castillo
INVENTOR

BY Stevens, Davis, Miller & Mosher
ATTORNEYS

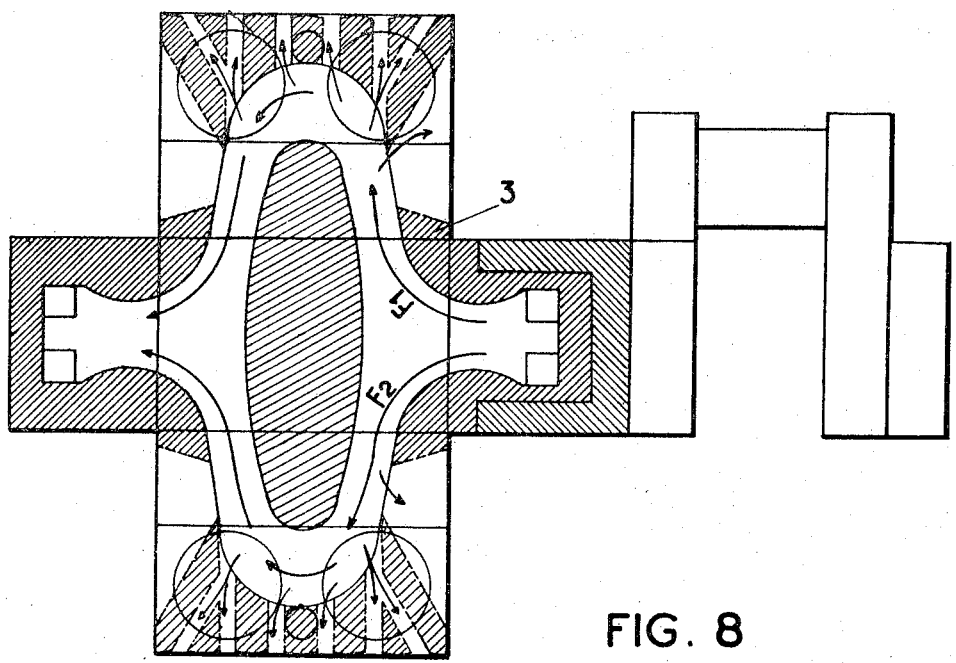
FIG. 8
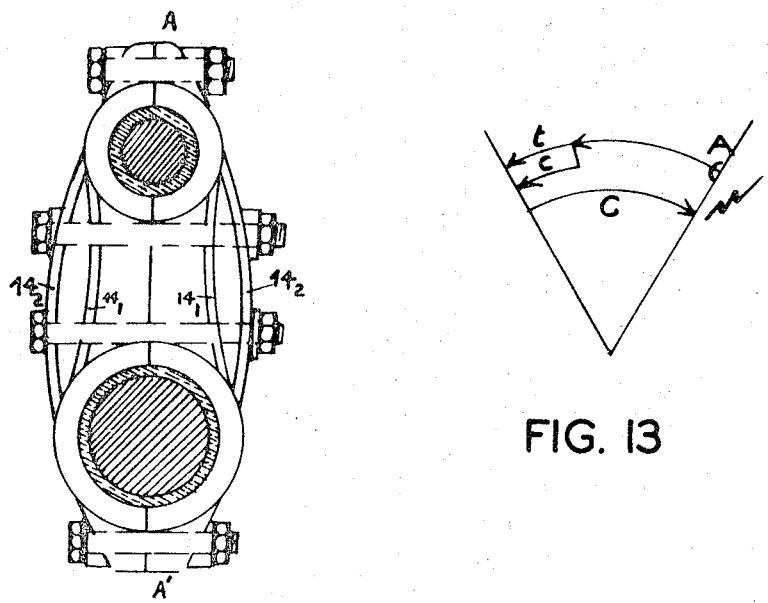
FIG. 13
FIG. 9

United States Patent Office 3,315,648
Patented Apr. 25, 1967

3,315,648
INTERNAL COMBUSTION ENGINE
Jacques Marc Georges Drake del Castillo,
1 Rue du Marechal Foch, Nantes, France
Filed Oct. 8, 1964, Ser. No. 402,595
Claims priority, application France, Oct. 11, 1963,
950,348; Apr. 10, 1964, 970,564; July 20, 1964,
982,337
10 Claims. (Cl. 123—18)

This invention relates to internal combustion engines and more particularly to engines in which an oscillating piston is reciprocatingly driven through an arcuate path. This invention deals with engines having either a two-cycle and four-cycle design and employs a unique lubrication system for this type of engine.

A first object of the present invention is to provide an internal combustion engine having a high displacement with small external dimensions.

Another object of the invention is to produce a four-stroke or two-stroke engine, each having a minimum of parts.

Other objects and advantages of this invention will be apparent upon consideration of the following detailed description of a preferred embodiment thereof in conjunction with the annexed drawings wherein:

FIG. 1 is a partial cross-section through the engine of the invention, showing the general arrangement of the driving members;

FIG. 8 is a schematic view showing the flow of oil within the piston, in particular for the lubrication between the oscillating piston and the walls defining the combustion chambers of the engine;

FIG. 9 is a view of the connecting rod between the oscillating piston and the engine flywheel;

FIG. 13 is a schematic view of a timing diagram of one of the combustion chambers of the two-stroke timing cycle engine.

Figure 5:
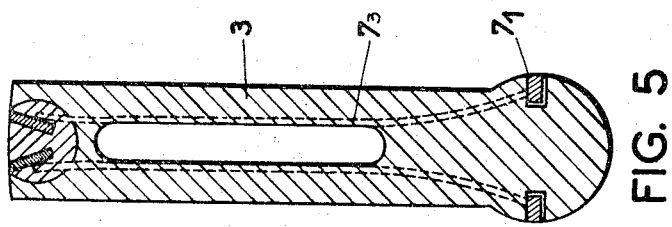
FIG. 5 is a view showing a variant of the sealing members of the piston shown in FIG. 1.

Referring now to the drawing and particularly FIG. 1 in accordance with the invention the oscillating piston engine 1 is formed of at least one volumetric enclosure 2 in the form of a cylindrical sector in which an oscillating piston 3 moves. On both sides of the side walls 4 of the volumetric enclosure 2 there are grouped intake and exhaust valves 5 controlled by cam shafts 6 housed on opposite sides of the longitudinal axis 7 of the engine. This particular arrangement makes it possible to group the essential parts of the engine within a minimum volume.

The rocker arms 6' are arranged on both sides of the oscillating piston 3, thus permitting extremely small dimensions. The oscillating piston 3 divides each of the volumetric enclosures 2 into a combustion chamber of variable volume.

In order to assure tightness between the combustion chambers, the piston has on its side a set of linear $7_3$ arranged on the edge of the lateral walls of the piston and sliding on the transverse partition separating the volumetric enclosures of the engine. In the embodiment shown in FIG. 1, the seals $7_3$ are centered on the outside and rest on the base $3_1$ of the piston. Sealing means $7_1$ housed in grooves provided at the base of the combustion enclosure to assure tightness at the periphery of the base of the pistons. Tightness at the upper part of the piston is obtained by outer sealing means 8 which rest on the contact sector 9 closing the upper part of the combustion chamber.

One or more grooves $7_2$ provided in the base of the combustion chamber constitute lubricating zones intended to supply lubrication of the bases of the pistons.

In the embodiment of the piston shown in FIG. 5, the piston 3 is formed of curved lateral seals $7_3$ resting at their base on two sealing means $7_1$ housed in the base of the pistons. The assembly of the sealing means is acted on by undated springs arranged at the bottom of the receiving grooves.

The spark plugs 10 of the engine are arranged in the upper part of the combustion chambers near the end of the stroke of the oscillating piston 3. When the oscillating piston 3 divides the volumetric enclosure 2 into two combustion chambers of equal volume, there is an engine which is strictly symmertcal on both sdes of the center line AA'.

Figure 2:
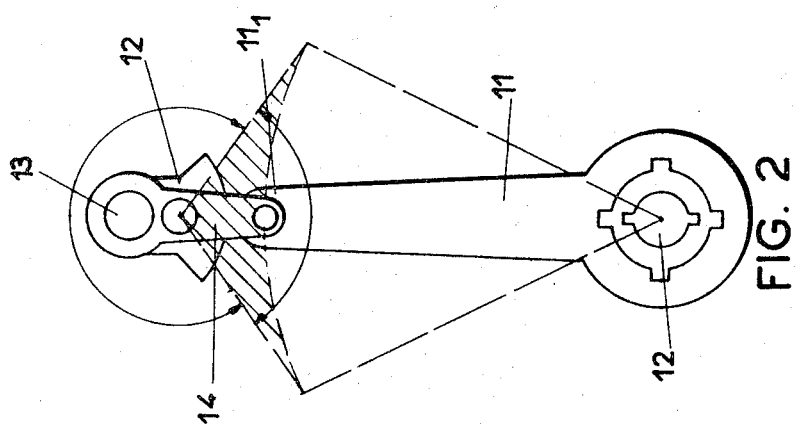
FIG. 2 is a schematic view showing the transmission of the movement from the oscillating displacement of the common piston shaft into continuous movement of rotation applied to a drive shaft.

The oscillating movement applied to the piston 3 by the successive expansions of the operating cycle of the engine is transformed into a movement of continuous rotation applied to a driving output shaft. The transmission of this movement is shown schematically in FIG. 2, in which a lever 11 is keyed onto the oscillating shaft 12 in such a manner that, through the displacement of the driving oscillating piston, there corresponds an identical displacement of the end $11_1$ of said lever. The end $11_1$ of the lever 11 is pivotably connected to the crank shaft 12' and crank pin 13 by connecting rod 14.

Figure 3:
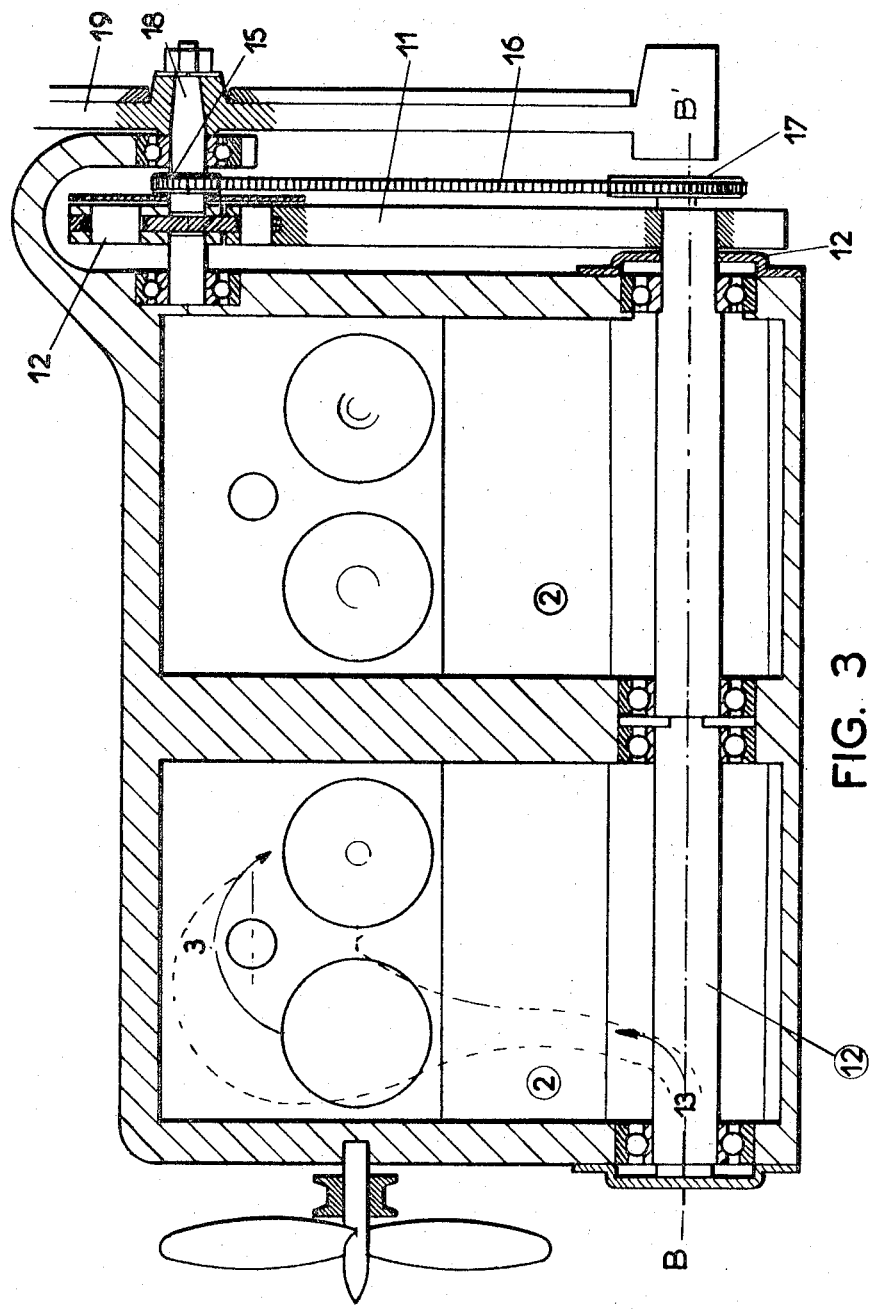
FIG. 3 is an elevational cross section of the engine showing the linear arrangement of the volumetric enclosures of the engine as well as the transmission of said engine.

In FIG. 3, the general arrangement of the engine in accordance with the invention is shown. At least two volumetric chambers 2 are arranged on a line along the longitudinal axis of the engine BB'. These volumetric enclosures are independent and each has an oscillating piston. The pistons 3 are keyed in a line on the oscillating shaft 12, and the shaft 12 and the pistons are hollow so as to provide a fluid flow circuit 13 intended to cool the moving parts of the engine by circulation of water or lubricant. In accordance with another embodiment, the cooling is effected by a sodium solution which fills the hollow body of the oscillating shaft and of the pistons, which are hermetically closed.

Figure 4:
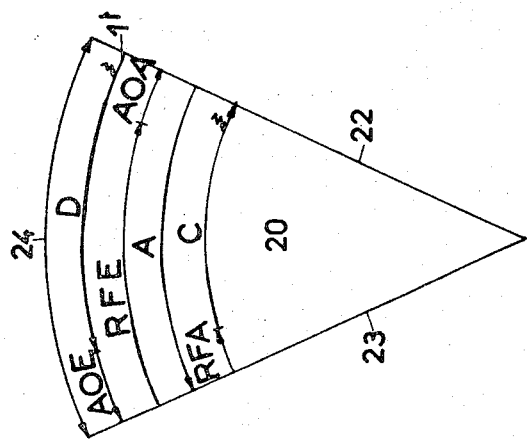
FIG. 4 is a schematic view of a timing diagram of one of the combustion chambers of the engine.

On the rear part of the engine as shown in FIG. 3 the transmission device is arranged. This transmission is shown schematically in FIG. 2. To the end of the oscillating shaft 12 there is keyed the lever 11 which actuates the rod of the crank shaft 12', as discussed above. A shaft 18 extends from the crank shaft 12' supporting a timing gear 15 which drives via an endless chain 16, and through sprocket 17, the cam shafts 6 (see FIG. 1) which control the opening and closing of the inlet and exhaust valves of each of the combustion chambers of the engine. The shaft 18 constitutes the engine output shaft to which is connected a clutch plate 19 or any other means of transmission. In the timing diagram (for either of the combustion chambers 20 and 21) shown in FIG. 4, there has been described a complete operating cycle in the combustion chamber 20 for the purposes of greater clarity, the diagram being drawn after the first explosion in the chamber 20. The lines 22 and 23 represent the dead centers of the oscillating piston upon each of its strokes, and the circular arc 24 represents the distance traversed by the oscillating piston. In the first stroke of the operating cycle, the oscillating piston is at 1$t$ near the wall 22. After explosion, the piston travels a distance "D" corresponding to the explosion. Before the end of the complete stroke, the sector AOE corresponds to the advance opening and exhaust, during which the exhaust valve opens gradually before the end of the stroke of the oscillating piston towards the wall 23.

The piston starts back again in the opposite direction, moving towards the wall 22 along a sector R'FE which corresponds to lag, closing and exhausting the exhaust gases. Before the piston reaches the wall 22, and the exhaust valve is closed, the inlet valve opens for a period of time determined by the sector AOA. This advance, opening, and admission occurring before the piston reaches the dead center 22. The piston starts back again in opposite direction towards the partition 23 along a path A while the inlet valve is still open, admitting the fuel-air mixture.

After the piston reaches wall 23 it is again driven in the direction of the wall 22. The inlet valve then closes and the piston passes over the distance RFA corresponding to the lag, closure, and admission time and then passes over the sector "C." During this time the gases are compressed and are again expanded when the spark plug 10 fires near the end of the stroke of the piston in the direction of the wall 22, whereupon a new cycle starts.

Work identical to that carried out in the chamber 20 takes place in the chamber 21.

In this engine, one has a four-stroke cycle for each of the combustion chambers but the cyclic regularity of a two-stroke engine is assured. As a matter of fact, two successive explosions take place in the same enclosure on either side of the oscillating piston, while in the volumetric enclosure of a second group of pistons the combustion chambers have the burned gases scavenged from them and are then fed with fresh gas, this taking place alternately for each of the volumetric enclosures of the engine.

Figure 6:
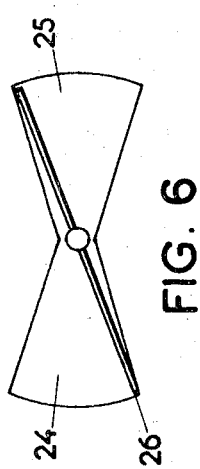
FIG. 6 is a schematic view of an embodiment of the engine in accordance with the invention.

In accordance with a special embodiment (FIG. 6), the engine is formed of at least two opposite volumetric sectors 24, 25 having a common piston 26 which divides the volumetric sector into four chambers.

Figure 7:
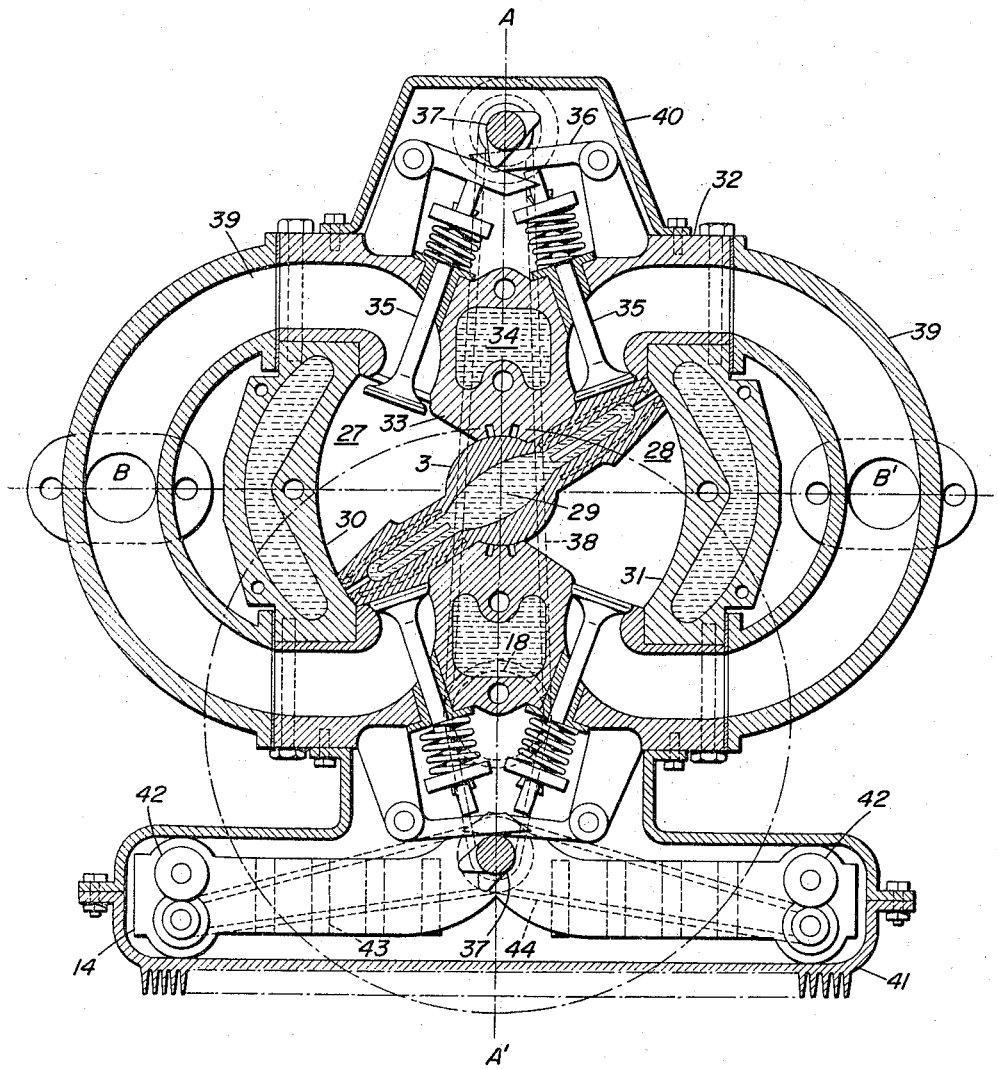
FIG. 7 is a partial sectional view of the engine in accordance with another embodiment.

In another embodiment (FIG. 7), the piston 3 of the engine is formed of an oscillating diaphragm which divides the volumetric enclosure where the driving strokes are established in four combustion chambers. The volume generated by the combustion chambers of the engine is present in the form of cylindrical sectors 27 and 28. These cylindrical sectors 27, 28, within which the piston or diaphram 3 oscillates, are delimited symmetrically with respect to the axis of oscillation 29 of the piston by housings 30 and 31. Each of these housings has a machined inner face constituting the cylindrical wall on which the ends of the oscillating diaphragm 3 move. Each of the housings 30 and 31 is made hollow so that it can be cooled by liquid circulation.

The housings 30 and 31 are closed at their upper and lower part by symmetrical cylinder heads 32 which receive the valves of the engine. Each of the cylinder heads 32 is provided with a centering extension 33 which serves as a bearing support for the axis of the oscillating diaphragm 3. In each of these extensions 33, there is provided a chamber 34 which permits a flow of liquid for the cooling of the said cylinder heads. Each of the cylinder heads is provided with a set of valves 35 controlled by a cam shaft 37 via rocker levers 36. The cam shaft is driven via a chain 38 which assures the rotation of these cam shafts from the engine output shaft 18.

The inlet and exhaust valves of an individual volumetric sector are arranged in a single vertical plane. Thus, for instance, in the case of the cylindrical sector 28, the valves visible in the cross-section of the engine to the right of the vertical axis of symmetry AA' of the latter are in each of the upper and lower cylinder heads, respectively, and correspond to inlet valves. Each of the inlet valves is connected to a common manifold 39 on which there is provided a fastening flange intended to receive a carburetor.

The exhaust manifolds of the engine are made identical to the intake manifolds and, like the latter, are arranged vertically.

The timing members of the upper cylinder head are enclosed in a timing housing 40.

The lower cylinder head has a cooling housing 41 enclosing the timing members of said cylinder head and has cooling fins in its lowest portion.

The mechanism permitting the pressure lubrication of the movable assembly of the engine is enclosed in the housing 41, and is composed of two oil gear pumps 42, one of which is intended to deliver the lubricant under pressure, while the other assures its return into a heat exchanger 43 which connects the two pumps together in order to assure suitable cooling of the lubricating liquid. Each of the pumps is driven in rotation via an endless chain 44 driven by the cam shaft 37 housed in the lower cylinder head of the engine.

The volumetric enclosures of cylindrical sector 27 and 28 are closed at the end by plates which rest both against the narrow portion of the walls of the oscillating diaphragm and against the cylindrical sectors 30 and 31.

The oscillating movement applied to the piston 3 by the successive expansions of the operating cycle is transformed into a movement of continuous rotation applied to the engine output shaft 18 in a manner identical to that defined in the first embodiment of the engine.

A lever is keyed onto the oscillating shaft of piston 3 in such a manner that to one displacement of the oscillating piston there corresponds an identical displacement at the end of the lever, thus effecting a pendulum movement transmitted to a crank shaft via a crank pin and connecting rod 14, the latter being show in detail in FIG. 9. It has two ribs $14_1$ curved inwardly and two ribs $14_2$ curved outwardly which gives this rod exceptional resistance to buckling. This rod can be developed as a single unit or else be made of two elements which can be assembled together along the longitudinal axis of said rod by a mechanical connection, such as a stud bolt.

In accordance with one essential feature of the invention, the oscillating piston 3 is formed of a hollow compensated diaphragm, within which there is maintained a flow of lubricant (FIG. 10) which permits both the removal of the heat transmitted to said piston through the operation of the engine and the lubrication of the walls of said piston in contact with the housings which close off the volumetric enclosure.

The oscillating piston or diaphragm 3 is shown in cross-section in FIG. 8. The circuit of the lubricant within the piston is represented by the arrows $F_1$ and $F_2$, respectively. The lubricant which comes into one of the plates supporting the pin of the piston 3 penetrates into the piston through orifices in communication between the bearings and the pin of the hollow piston.

The hollow space provided within the latter makes it possible to conduct the said lubricant in the direction of orifices provided on the narrow portion of the walls of the piston, as well as towards its ends in contact with the walls of the cylindrical sectors.

The longitudinal pin of the piston is lubricated via a series of orifices provided in each of the cylinder heads and fed by a branch line in communication with the bearing of the plate through which the oil enters the piston, an outlet being provided on the bearing of the opposite side plate.

The lubricant, after having passed through the piston, is then returned via the suction pump of the lubricating circuit. This circuit is shown in detail in FIG. 10 in which the oscillating piston 3 moves between the plates $44_1$ and 45 which are secured respectively to the end of the cylinder heads 34 of the engine and the end of the cylindrical sectors 30 and 31.

Figure 10:
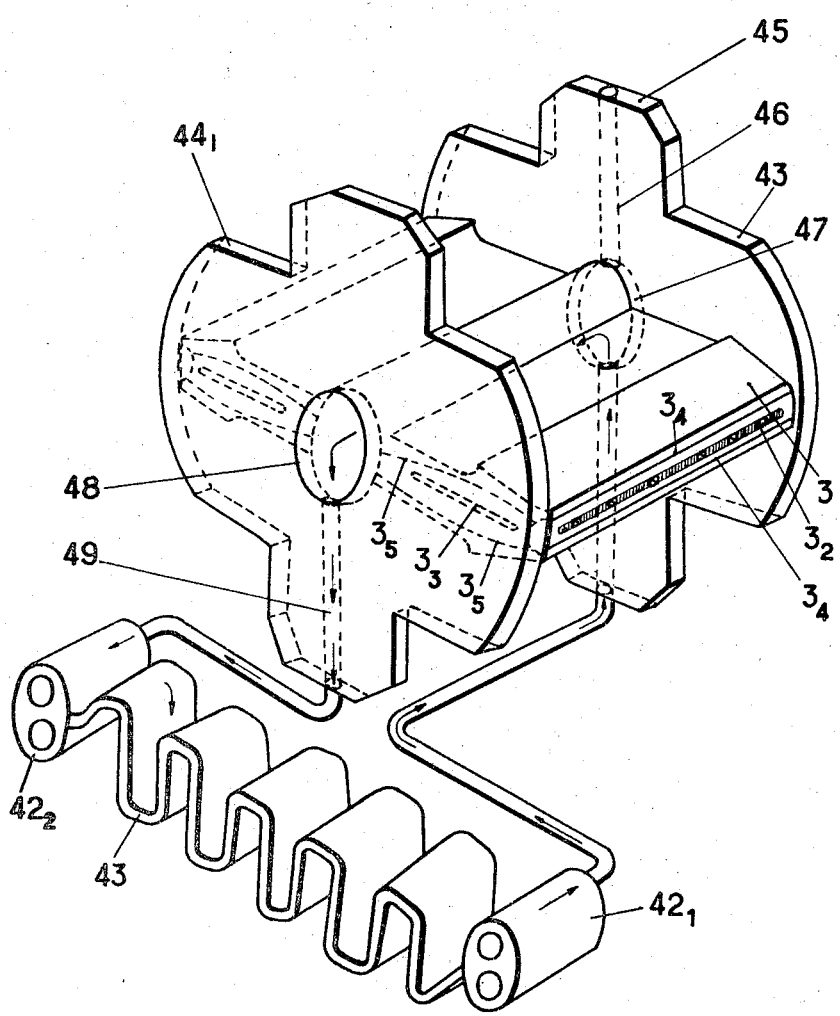
FIG. 10 is a perspective view showning in part the internal members of the engine and the lubricating circuit for each of its essential members.

The lubricating and cooling circuit of the piston 3 is established in the following manner (FIG. 10).

A filling orifice 45 located at the upper end of the plate 43 connects to a conduit 46 in communication with the bearing 47. The pin of the oscillating piston 3 has an orifice placing the conduit 46 in communication with a hollow space provided within the piston so that the lubricant fills up the entire inner volume of the piston and passes through the openings $3_2$ and $3_3$ provided in the segment lines $3_4$, $3_5$ in such a manner that the lubricant caught between these segments lines cannot flow out within the combustion chambers of the engine.

A uniform film of lubricant is established along the walls of the side plates $44_1$ and 45 and along the inner walls of the cylindrical sectors 30 and 31; the return of the lubricant takes place via the bearing 48 communicating on the one hand with the hollow shaft of the oscillating piston and on the other hand with a conduit 49 which conducts the lubricant towards the oil pumps.

The circulation is assured under pressure within the lubrication circuit by a pump $42_1$ delivering the oil towards the bearing 47 of the side plate 43, the pump $42_2$ assuring the return of said oil into a heat exchanger 43 composed of a corrugated element within which the lubricant is cooled.

A liquid circulation arrangement is also provided via the side plate $44_1$ and 45 so as to assure the cooling of the cylinder heads of the engine, as well as of the cylindrical sectors within which chambers have been provided for the liquid circulation.

In accordance with one feature of the invention, the engine is developed and constructed in such a manner as to operate in accordance with a two-stroke cycle, and for this purpose has a device for the distribution and evacuation of the combustion gases which consists of conduits connecting into ports provided on the periphery of the oscillating diaphragm 3, as well as transfer conduits which permit the establishing of a two-stroke timing cycle permits the elimination of the timing members, such as cam shafts, valves, mechanical control of the shafts and valves, so as to simplify to the utmost the construction of the engine and make it possible substantially to reduce its overall dimensions.

In order to provide a two-stroke timing cycle (FIGS. 11 and 12), each of the cylindrical sectors is provided with an inlet conduit 50 connecting through a port 51 into the walls of the housings 30 and 31. The conduit 50 connects into a conduit 52 provided in the cylinder head $32_1$ in order to place the conduit 50 in communication with the manifold 53 which conducts the fuel mixture away from a carburetor 54.

During the oscillating movement of the oscillating diaphragm 3, the latter covers and uncovers the ports 51 of the inlet conduits 50, the position and the diameter of said inlet ports determining the duration of the intake stroke. The admission of the fresh gases takes place between the same faces of the oscillating diaphragm as act to compress the gases introduced through one of the ports 51.

Figure 11:
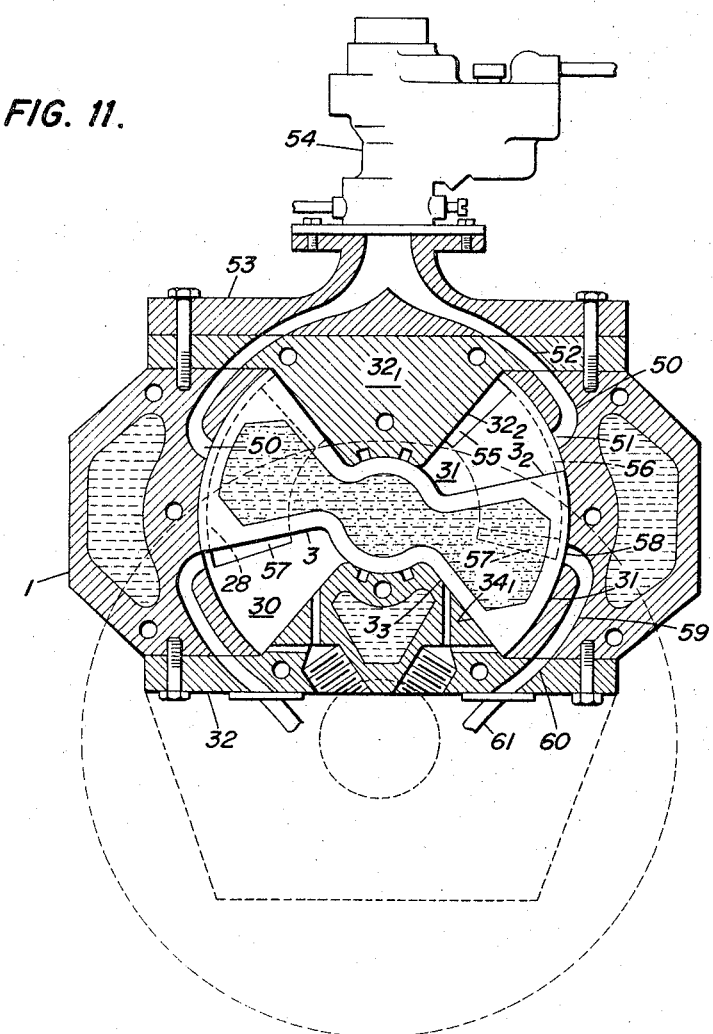
FIG. 11 is a cross sectional view of the two-stroke engine.
Figure 12:
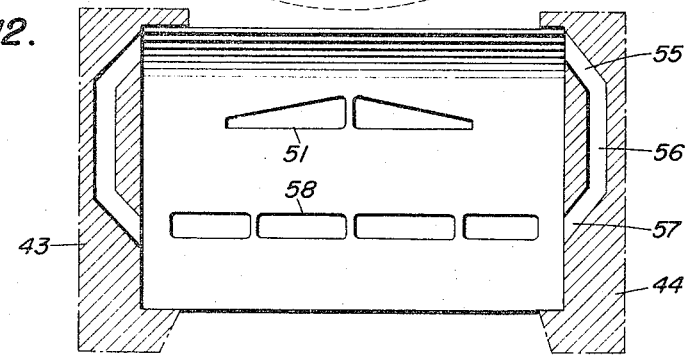
FIG. 12 is a partial sectional view of the surface of one of the cylindrical sectors of the engine closed at each of its ends, flanges intended in particular to support the oscillating diaphragm of the engine and its connecting rod bearings for the transmission of the movement.

In the embodiment shown in FIG. 11, the gases introduced between the face $3_2$ of the oscillating diaphragm and the inclined face of the cylinder head $32_2$ are, upon the upward movement of the oscillating diaphragm, evacuated from the admission chamber 28 to penetrate via a port 55 into a transfer channel 56 leading to a port 57 which will be uncovered by the oscillating diaphragm near the end of its upward stroke, so that the gases expelled by the face $3_2$ of the oscillating diaphragm penetrate into the combustion chamber defined by the face $3_3$ of the oscillating diaphragm and the inclined wall $34_1$ of the lower cylinder head.

In its downward movement the oscillating diaphragm will close the port 57 of the transfer conduit 56; the gases which have come from the port 57 will be compressed until they are in the vicinity of the face $34_1$ of the cylinder head, where the compressed gases will detonate under the action of an electric spark generated by a conventional electrical system associated with the engine and introduced into the chamber by a spark plug thus forcing the oscillating diaphragm back in the ascending driving movement.

The spark plugs 10 of the engine are fitted in the part of the combustion chambers defined by the lower cylinder head (33, $34_1$) near the end of the stroke of the oscillating piston 3.

In the vicinity of the end of the upward stroke of the diaphragm, the face $3_3$ of the latter uncovers an exhaust port 58 connected to a conduit 59 conducting the combustion gases into the conduit 60 provided in a lower cylinder head 32, to be evacuated finally through an exhaust gas manifold 61.

In the timing diagram shown in FIGURE 13 there has been discribed a complete operating cycle in the right cylindrical sector. The piston is in the admission position. After admission, the piston travels simultaneously a distance "$t$" corresponding to the transfer and a distance "$e$" corresponding to the evacuation of the exhaust gas. The piston travels back again in the opposite direction and then passes over the sector "$c$." During this time the gases are compressed and are expanded when the spark plug 10 fires near the end of the stroke of the piston.

The inlet conduit 50 and exhaust conduit 59 are provided in the cylindrical sectors 30 and 31, while the transfer conduits 56 are provided in the side plates 43 and 44 which are secured respectively to the end of the cylinder heads of the engine to close off the cylindrical sectors 30 and 31.

In accordance with a particular embodiment, the piston 3 will be provided with an inner recess intended to convey a cooling liquid, but the recess intended to receive a coolant will also be sealed in order to contain sodium.

What is claimed is:

1. An internal combustion engine comprising a housing defining at least one cylindrical sector volumetric enclosure, at least one hollow oscillating piston pivotally mounted on a drive shaft within said housing forming a movable partition which moves in an arcuate path within said volumetric enclosure dividing said enclosure into two adjacent combustion chambers of a volume which is variable in relation to movement of said piston, said piston being secured to a shaft, crank means associated with said shaft to change oscillating motion to reciprocating motion, a set of linear seals arranged on the edge of the lateral walls of the piston and sliding on the transverse walls of the housing and outer sealing means resting on the top of said piston sliding on the upper part of the combustion chamber, oil pumps for lubricating and cooling the engine located in a housing provided with cooling fins, conduit means to interconnect said pumps having a large number of undulations acting as a heat exchanger to permit cooling of the lubricant flowing between the two pumps, a lubricating circuit passing successively from one of the pumps through one of the side plates formed in said enclosure and through the bearings of the drive shaft of the engine thereby lubricating said bearings, the return of the lubricant from said shaft flowing through an opposite side plate to the second pump and to the heat exchanger, thus forming a flow within the housing and the shaft which assures adequate cooling and lubrication of the engine.

2. An internal combustion engine as defined in claim 1 wherein the hollow portion of said piston is hermetically sealed and contains a coolant including sodium.

3. An internal combustion engine as defined in claim 1 wherein said conduit means connects said hollow portion of said piston and said lubricating circuit and said piston contains a plurality of openings communicating with said hollow portion through which the uniform film of lubricant is applied to the inner walls of said housing.

4. An engine as defined in claim 3 having at least two volumetric enclosures each divided into two combustion chambers fed and scavenged by timing means defining a four stroke cycle for each of said chambers.

5. An engine as defined in claim 4 having at least two volumetric enclosures each divided into two combustion chambers fed and scavenged by timing means defining a two stroke cycle for each of said chambers.

6. An internal combustion engine as defined in claim 4 including two cam shafts, means to rotatably drive said cam shafts from said drive shaft, inlet and exhaust valve means associated with each of said enclosures and actuated by said cam shafts, said actuation means controlled in such a manner as to obtain two successive driving strokes in the same enclosure and simultaneously exhaust and admission strokes in the second enclosure.

7. An internal combustion engines as defined in claim 6 wherein said housing includes a double cylindrical sector closed symmetrically by cylinder heads, housing and side plates and manifold means for the admission of a ful mixture and the escape of burned gases discharging respectively into inlet and exhaust conduits of said cylinder heads, said cylinder heads and both said manifold means being located in substantially the same vertical plane for one volumetric sector.

8. An internal combustion engine as defined in claim 5 wherein said oscillating piston moves in an arcuate path in a double cylindrical sector enclosed by cylinder heads formed in said housing and includes inlet conduits for the burned gases connected into said cylindrical sectors via ports or openings located on the path of the oscillating piston, said inlet conduits being connected into a pre-compression chamber defined by the upper walls of the oscillating piston and the stationary walls of the upper cylinder head with an opening provided at the highest part of said pre-combustion chamber communicating with a transfer channel connected to an opening in a combustion chamber of the engine, said combustion chamber being defined by the lower faces of the oscillating piston and the stationary faces of the lower cylinder head of the engine, and exhaust ports or openings provided in the lower part of the cylindrical sectors connected to conduits permitting the evacuation of the burnt gases at the end of the driving stroke.

9. An internal combustion engine as defined in claim 1 including a compensated oscillating diaphragm moving in an arcuate path in a double cylindrical sector enclosed by cylinder heads, housings and side plates, timing means for the entrance of burning gases and the exhaust of burned gases in a two-stroke operating cycle comprising inlet conduits for the burning gases conected into said cylindrical sectors via ports or openings located on the path of the oscillating diaphragm, said inlet conduits connected into a pre-compression chamber defined by the upper walls of the oscillating diaphragm and the stationary walls of the upper cylinder head with an opening provided at the top of said pre-combustion chamber communicating with a transfer channel connected to an opening in a combustion chamber of the engine, said combustion chamber defined by the lower faces of the oscillating diaphragm and stationary faces of the lower cylinder head of the engine, and exhaust ports provided in the lower portion of the cylindrical sectors connected to conduits permitting the evacuation of the burned gases at the end of the driving stroke.

10. An internal combustion engine as defined in claim 1 including a compensated oscillating diaphragm pivotally mounted on a drive shaft and moving in an arcuate path in a double cylindrical section enclosed by cylinder heads, housings, and side plates, two cycle timing means for the admission of the burning gases and the exhaust of the burned gases including admission conduits for the burning gases connected into the cylindrical sectors, admission conduits for the burning gases and exhaust conduits for the burned gases arranged in the cylindrical sectors, and transfer channels provided in the side plates of the engine which are secured to the cylinder heads and the cylindrical sectors permitting the passage of gases from the pre-compression chamber to the compression chamber.

References Cited by the Examiner

FOREIGN PATENTS

| | | |
|---|---|---|
| 18,949 | 8/1929 | Australia. |
| 799,436 | 3/1937 | France. |
| 9,622 | 1915 | Great Britain. |

MARK NEWMAN, *Primary Examiner.*

WENDELL E. BURNS, *Examiner.*